US012423549B2

(12) United States Patent
Minks

(10) Patent No.: US 12,423,549 B2
(45) Date of Patent: Sep. 23, 2025

(54) DATA STORAGE MEDIUM IN THE FORM OF A CARD AND METHOD FOR PRODUCING A DATA STORAGE MEDIUM IN THE FORM OF A CARD

(71) Applicant: GIESECKE+DEVRIENT EPAYMENTS GMBH, Munich (DE)

(72) Inventor: Andreas Minks, Bad Wiessee (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/709,871

(22) PCT Filed: Nov. 23, 2022

(86) PCT No.: PCT/EP2022/025533
§ 371 (c)(1),
(2) Date: May 14, 2024

(87) PCT Pub. No.: WO2023/094027
PCT Pub. Date: Jun. 1, 2023

(65) Prior Publication Data
US 2025/0021783 A1    Jan. 16, 2025

(30) Foreign Application Priority Data
Nov. 24, 2021   (DE) ..................... 10 2021 005 830.5

(51) Int. Cl.
*G06K 19/077*   (2006.01)
(52) U.S. Cl.
CPC . *G06K 19/07722* (2013.01); *G06K 19/07771* (2013.01)

(58) Field of Classification Search
CPC ................... G06K 19/07722; G06K 19/07771
USPC ......................................................... 235/488
See application file for complete search history.

(56) References Cited

U.S. PATENT DOCUMENTS

| 2015/0206047 | A1* | 7/2015 | Herslow | ................. | H01Q 7/06 |
| | | | | | 235/492 |
| 2018/0204105 | A1 | 7/2018 | Herslow et al. | | |
| 2021/0154898 | A1* | 5/2021 | Lowe | ..................... | H05K 3/285 |
| 2021/0350198 | A1* | 11/2021 | Finn | ................ | G06K 19/07722 |

(Continued)

FOREIGN PATENT DOCUMENTS

WO    2021081175 A1    4/2021

OTHER PUBLICATIONS

German Search Report from corresponding DE Application No. 102021005830.5, Jul. 21, 2022.
(Continued)

*Primary Examiner* — Allyson N Trail
(74) *Attorney, Agent, or Firm* — Workman Nydegger

(57) ABSTRACT

A data storage medium in the form of a card, includes: a flexible inlay with a contact structure located on an upper face of the inlay. The inlay has an integrated circuit spaced apart from the contact structure and has at least one antenna; an upper layer, which is located above the inlay, wherein the upper layer has an opening, in which the contact structure is located; and a lower layer, which is located below the inlay. The upper layer includes a continuous metal layer and a ferrite layer, the ferrite layer being located between the metal layer and the flexible inlay. A method is provided for producing a data storage medium in the form of a card.

16 Claims, 2 Drawing Sheets

(56) References Cited

U.S. PATENT DOCUMENTS

2023/0137393 A1* 5/2023 Lotya ............... G06K 19/07783
                                                                     29/850
2024/0070425 A1* 2/2024 Lowe ............... G06Q 20/40145

OTHER PUBLICATIONS

International Search Report from corresponding PCT Application No. PCT/EP2022/025533, Mar. 13, 2023.

* cited by examiner

DATA STORAGE MEDIUM IN THE FORM OF A CARD AND METHOD FOR PRODUCING A DATA STORAGE MEDIUM IN THE FORM OF A CARD

BACKGROUND

The invention relates to a data carrier in the form of a card, in particular a smartcard, and to a method for producing a data carrier in the form of a card.

A multiplicity of data carriers in the form of cards are known from the prior art, for example smartcards, chip cards, integrated-circuit cards, dual-interface cards, access cards or identification cards. In particular, the use of smartcards, for example credit cards or payment cards, has become established for carrying out financial transactions. Such a data carrier in the form of a card has a card body and an integrated circuit embedded into the card body, for example in the form of a chip module with a chip. The chip module is usually arranged or fitted in a recess, for example a cavity or module opening, of the card body.

For the production of data carriers in the form of cards, it is furthermore known to use various components for contact-based and/or contactless data transmission, for example the chip module with a chip and a contact structure for contact-based data transmission, and/or further components, for example an antenna or a capacitor for contactless data transmission.

Chip modules with an integrated or coupled antenna, which allow both contact-based and noncontact or contactless data transmission or communication, will be considered below. For example, data carriers in the form of cards with an RFID (radiofrequency identification) functionality may thereby be provided.

Data carriers in the form of cards with a metallic upper face or a metallic core layer are particularly hardwearing and are regarded as high-quality. Data carriers in the form of cards with an inner-lying or outer-lying metal layer are therefore becoming increasingly widespread.

The functionality of such a data carrier in the form of a card consists in using a chip module which itself has a coupled antenna, in particular a coil (coil on module). This coil couples on the card body with a metal layer. However, the metal layer may interfere with or fully prevent the communication or data transmission. The coupling therefore functions only if undesired ring closures of the magnetic flux can be avoided. In other words, perturbing capacitive influences of the metal layer should be prevented.

It is known in this context to arrange a ferrite layer between the antenna and the metal layer in order to shield perturbing capacitive influences, or alternatively to provide a slit in order to interrupt ring closures in the metal layer, or to prevent short-circuit currents.

With the introduction of a metallic layer in the data carrier in the form of a card, however, disadvantageous shielding of the antenna may occur despite the slit or the ferrite layer.

SUMMARY

It is therefore an object of the invention to provide a data carrier in the form of a card having an improved antenna. It is furthermore an object of the present invention to provide a method for producing a data carrier in the form of a card.

Embodiments and developments of the invention are specified in the dependent claims and are disclosed with reference to the description and the figures. Features and details that are described in connection with the data carrier in the form of a card according to the invention also apply in connection with the method according to the invention, and vice versa, so that in respect of the disclosure reference may always be made between the individual aspects of the invention.

In the context of the application, the invention may preferentially be used for smartcards, particular for credit cards and payment cards. Use for metal cards is preferentially provided, in particular for fully metal cards, hybrid metal cards with a metallic layer and a plastic layer, as well as for metal cards that are coated or printed on one or both sides with plastic or varnish. Use may, however, also be provided for other RFID devices, for example key cards, access cards, tokens, wearables or security passes.

According to a first aspect of the invention, a data carrier in the form of a card, in particular a smartcard, which comprises the following components is provided: a flexible inlay with a contact structure arranged on an upper side of the inlay, the inlay having an integrated circuit spaced apart from the contact structure and at least one antenna, an upper layer which is arranged above the inlay, the upper layer having a recess in which the contact structure is arranged, and a lower layer which is arranged underneath the inlay. The upper layer comprises a continuous metal layer and a ferrite layer, the ferrite layer being arranged between the metal layer and the flexible inlay.

In the context of the application, a continuous metal layer refers to a metal layer that does not have a slit or a similarly configured discontinuity for interrupting ring closures in the metal layer, or for preventing short-circuit currents. In other words, the continuous metal layer is not interrupted and has if applicable only the module opening for receiving the chip module. So that the functionality of the data carrier in the form of a card is not perturbed or interrupted, however, a ferrite layer is provided in order to shield against perturbing capacitive influences. The antenna of the flexible inlay may preferentially be shielded by the ferrite layer from the metal layer. In other words, the ferrite layer makes it possible for electromagnetic radiation to be transmitted from a reader to the smartcard and back, since the metal layer is shielded by the ferrite layer.

Further, in the context of the application, the integrated circuit is preferentially configured as a chip module which comprises a chip. In particular, the chip or the chip module is arranged on the flexible inlay, preferentially on a lower side of the flexible inlay. The contact structure is preferentially arranged on the opposite upper side of the flexible inlay. In particular, the chip is connected by means of wires to contacts of the contact structure. In other words, the chip module is coupled with the contact structure. The contacts of the contact structure may be defined in their number, size and position by international standards so that the function of the smartcard can be ensured in any reader. Advantageously, contact-based data transmission between the smartcard and a reader may be established by means of the chip module and the contact structure.

The flexible inlay furthermore comprises an antenna (as a coil) for inductive contactless data transmission. The antenna is in particular coupled with the chip, or the chip is connected to the antenna. The antenna is preferentially arranged on the lower side of the inlay. A contactless smartcard can communicate with a reader by electromagnetic waves, in which case the smartcard may function in a similar way to a transmission and reception device. In particular, electromagnetic waves emitted by the reader generate an oscillating electromagnetic field which, for example, generates an oscillating electrical voltage in the coil or antenna of the flexible inlay so that the chip can be supplied with power. The oscillations of the voltage may be detected as a signal and converted into data in the chip. These data may in turn be processed in the chip and converted into variations of the electromagnetic field, which may in turn be detected by the reader and converted into data. Overall, the flexible inlay with the chip module, the contact structure and the antenna may therefore allow contact-based and/or contactless data transmission.

One essential concept of the present invention is therefore that, by means of an inlay, the integrated circuit and/or the antenna can be relocated from the region of the recess and a metal layer is nevertheless present in the data carrier in the form of a card. This has the advantage, in particular, that the relocation from the recess makes it possible to use an enlarged antenna since more space is available on the lower side of the flexible inlay than in the region of the recess.

The invention therefore has the advantage that the data carrier in the form of a card proposed here may advantageously have an enlarged antenna, so that both the transmission power and the energy input are increased. In particular, the RFID functionality of the data carrier in the form of a card may thereby be improved.

Since the upper layer comprises the metal layer, the data carrier in the form of a card may be configured for example as a metal-face card.

Particularly preferably, a first adhesive layer may be arranged between the ferrite layer and the metal layer and a second adhesive layer may be arranged between the ferrite layer and the inlay, the recess extending through the metal layer, the adhesive layers and the ferrite layer. The adhesive layers have the advantage of improved adhesion between the individual layers, for which reason the metal layer can be durably connected to the ferrite layer and the ferrite layer can be durably connected to the inlay. In other words, the sequence of the layers present in the upper layer is configured by way of example as follows: The second adhesive layer is arranged on the upper side of the inlay. The ferrite layer is arranged on the second adhesive layer. The first adhesive layer is arranged on the ferrite layer and the metal layer, which may form an outer-lying layer or upper face of the data carrier in the form of a card, is arranged on the first adhesive layer. The recess in which the contact structure is arranged is configured in particular as a hole in the upper layer, which extends through the metal layer, the adhesive layers and the ferrite layer. In other words, the recess forms a type of cavity or penetration through said layers of the upper layer.

Preferably, the lower layer may comprise a plastic layer, a layer with optical features and an outer-lying overlay layer. In general, any desired number of individual layers may be provided for the upper layer and the lower layer, depending on the particular application. The layer with optical features and the overlay layer may preferentially be formed from a plastic and may, for example, be used for security features in the optical, IR and/or UV range as well as configuration features. Items of information may also be made available. In other words, the sequence of the layers present in the lower layer is configured by way of example as follows: The plastic layer is arranged on the lower side of the inlay. The layer with optical features is arranged underneath the plastic layer. The overlay layer, which may form an outer-lying layer or lower face of the data carrier in the form of a card, is arranged underneath the layer with optical features. In particular, the overlay layer may in general be configured to be transparent. Preferentially, the layer with optical features may in general be configured as a printed layer.

In one preferred embodiment, an insert which positions the contact structure in the recess of the upper layer may be arranged underneath the contact structure. This insert may, for example, be formed from a plastic and may have the same dimensions as the contact structure. During the production of the data carrier in the form of a card, the insert may press the contact structure in the recess into the correct position so that the contacts of the contact structure are flush-mounted with the upper layer. Since the lower layer is present underneath the insert, a controlled surface pressure can straightforwardly be exerted onto the insert. This facilitates the production of the data carrier in the form of a card, in particular the positioning of the contact structure in the recess of the upper layer. The insert may be configured as a single element or as a constituent of a layer, for example the inlay or the lower layer. The insert may particularly preferentially be arranged in the lower layer underneath the contact structure, the insert being in particular arranged between the plastic layer and the layer with optical features.

Further preferably, a height of the insert, of the inlay, of the plastic layer and of the contact structure may correspond to a height of the recess of the upper layer. This can straightforwardly ensure that the contacts of the contact structure are flush-mounted with the upper layer, or with the upper face of the data carrier in the form of a card.

According to a second aspect of the invention, a data carrier in the form of a card, in particular a smartcard, which comprises the following components is provided: a flexible inlay with a contact structure arranged on an upper side of the inlay, the inlay having an integrated circuit spaced apart from the contact structure and at least one antenna, an upper layer which is arranged above the inlay, the upper layer having a recess in which the contact structure is arranged, and a lower layer which is arranged underneath the inlay. The lower layer comprises a continuous metal layer and a ferrite layer, the ferrite layer being arranged between the metal layer and the flexible inlay.

In particular, the data carrier in the form of a card according to the second aspect has the same advantages as have been described with reference to the data carrier in the form of a card according to the first aspect. Since the lower layer comprises the metal layer, the metal layer may by way of example be configured to be thicker and the data carrier in the form of a card may comprise more metal material in order to increase the efficacy.

Preferentially, a first adhesive layer is arranged between the ferrite layer and the metal layer and a second adhesive layer is arranged between the ferrite layer and the inlay. The adhesive layers have the advantage of improved adhesion between the individual layers, for which reason the metal layer can be durably connected to the ferrite layer and the ferrite layer can be durably connected to the inlay. In other words, the sequence of the layers present in the lower layer is configured by way of example as follows: The second adhesive layer is arranged on the lower side of the inlay. The ferrite layer is arranged underneath the second adhesive layer. The first adhesive layer is arranged underneath the ferrite layer and the metal layer, which may form an outer-lying layer or lower face of the data carrier in the form of a card, is arranged underneath the first adhesive layer.

Particularly preferably, the upper layer comprises a third adhesive layer, a layer with optical features and an outer-lying overlay layer, the third adhesive layer being arranged between the layer with optical features and the inlay, the recess extending through the third adhesive layer, the layer with optical features and the overlay layer. In other words, the sequence of the layers present in the upper layer is configured by way of example as follows: The third adhesive layer is arranged on the upper face of the inlay. The layer with optical features is arranged on the third adhesive layer. The overlay layer, which may form an outer-lying layer or upper face of the data carrier in the form of a card, is arranged on the layer with optical features. The recess in which the contact structure is arranged is configured in particular as a hole in the upper layer, which extends through the third adhesive layer, the layer with optical features and the overlay layer. In other words, the recess forms a type of cavity or penetration through the layers of the upper layer.

Altogether, the layers of the data carrier in the form of a card preferentially form the card body. In other words, the card body can be formed from a multiplicity of individual layers stacked on one another.

Alternatively or in addition, an insert which positions the contact structure in the recess of the upper layer may be arranged underneath the contact structure. Particularly preferentially, the insert may be arranged on the lower layer underneath the contact structure, the insert being in particular arranged between the inlay and the second adhesive layer.

Preferably, a height of the insert, of the inlay and of the contact structure may correspond to a height of the recess of the upper layer. This can straightforwardly ensure that the contacts of the contact structure are flush-mounted with the upper layer.

Alternatively or in addition, the metal layer may be covered with at least one outer-lying layer. This additional layer or these additional layers may be formed from a plastic and may, for example, be used for security features in the optical, IR and/or UV range as well as configuration features. Items of information may also be made available.

Particularly preferentially, inner-lying edges of the recess of the upper layer are provided with a chamfer. On the one hand, self-centering of the contact structure in the recess may be achieved when the layers are being joined together. On the other hand, excessive compression or even damage of the inlay when joining together may be prevented, particularly in the case of a metal layer.

Advantageously, the antenna may be arranged in the region of a circumferential face of the data carrier in the form of a card. The data carrier in the form of a card may therefore have an enlarged antenna, so that both the transmission power and the energy input are increased. If the turns of the antenna are arranged in the region of the circumferential face, that is to say as far outward as possible, the size or the diameter of the antenna may be maximized.

According to a third aspect, a method for producing a data carrier in the form of a card according to one of the embodiments above is provided, the method having the following steps:
providing a flexible inlay having a contact structure of the data carrier in the form of a card, which is arranged on an upper side of the inlay, the inlay having an integrated circuit spaced apart from the contact structure and at least one antenna,
arranging an upper layer having a recess on the upper side of the inlay, in such a way that the contact structure is arranged in the recess, arranging a lower layer underneath the inlay, and
laminating the layers to form a data carrier in the form of a card.

The various steps of the method may also be carried out in other sequences. For example, the contact structure may not be arranged in the recess until the lamination of the layers. The contacts of the contact structure are then arranged on the recess, for example positioned underneath the recess, beforehand.

Overall, the method according to the invention therefore has the same advantages as have been explained with reference to the data carrier in the form of a card according to the invention.

BRIEF DESCRIPTION OF THE DRAWINGS

The present invention will be described below with reference to the appended figures by way of example in the context of embodiments. Individual features of the embodiments may of course be freely combined with one another, insofar as is technically suitable, without departing from the scope of the present invention. Elements with the same function and effect are provided with the same reference signs in the figures. In the figures, schematically.

DETAILED DESCRIPTION OF VARIOUS EMBODIMENTS

Figure 1:
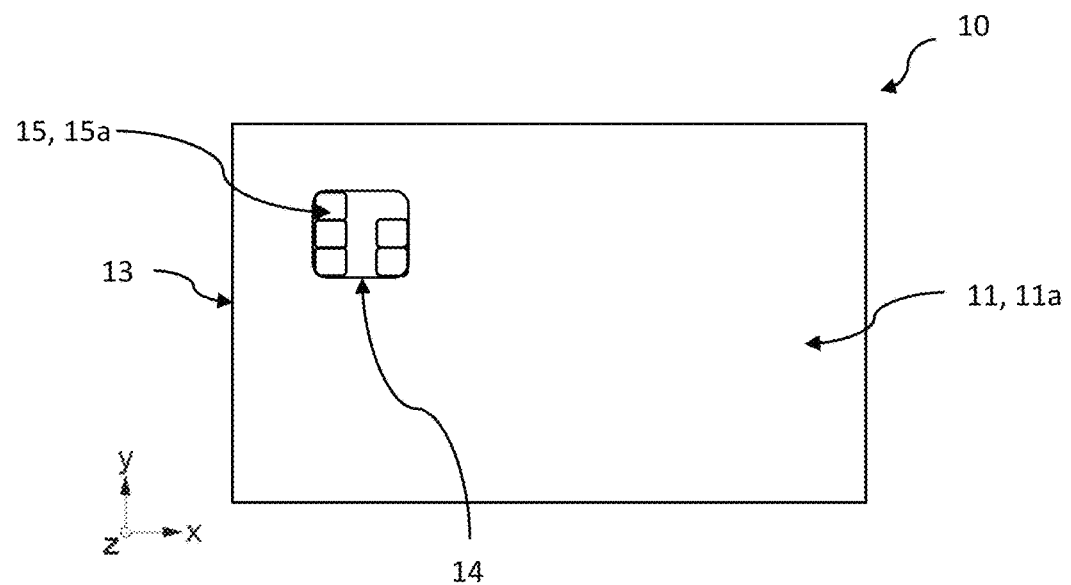
FIG. 1: shows a plan view of a data carrier in the form of a card according to a first exemplary embodiment.
Figure 2:
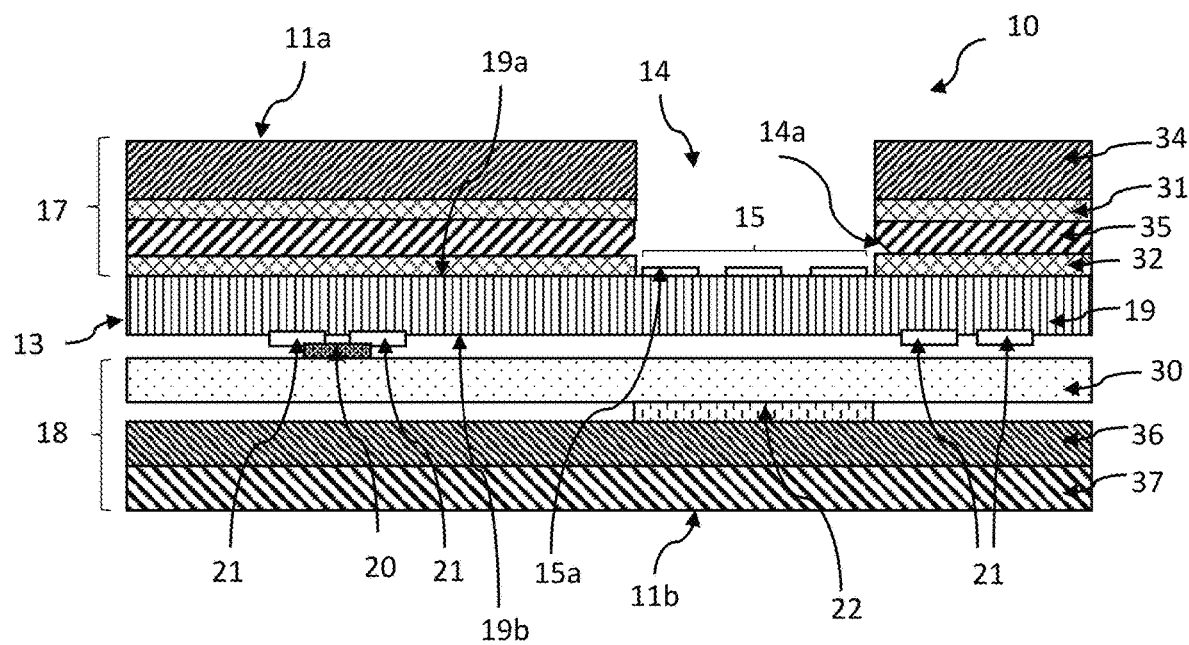
FIG. 2: shows a sectional representation of a data carrier in the form of a card according to a further exemplary embodiment.

FIG. 1 shows a plan view of a data carrier in the form of a card 10 having a card body 11. The data carrier in the form of a card 10 is configured by way of example as a smartcard. The data carrier in the form of a card 10, or the card body 11, has a substantially rectangular base shape with an upper face 11a and an opposite lower face 11b, of which only the upper face 11a is visible in FIG. 1. The other, opposite lower face 11b is represented in FIG. 2. The upper face 11a and the lower face 11b run parallel to one another and are connected by a circumferential face 13 extending all around.

The data carrier in the form of a card 10 has a rectangular shape in an x-y plane. The thickness or height of the data carrier in the form of a card 10 extends in the z direction.

A recess 14 for a contact structure 15, with by way of example five contacts 15a represented, may be seen in the upper face 11a of the data carrier in the form of a card 10. The recess 14 extends into the data carrier in the form of a card 10. The recess 14 is created for example by means of a laser operation or a milling operation.

The data carrier in the form of a card 10, or the card body 11 of the data carrier in the form of a card 10, is formed from a plurality of layers lying on one another.

In particular, the data carrier in the form of a card 10 has a flexible inlay (not represented) with a contact structure 15 arranged on an upper side of the inlay 19 (and visible through the recess 14), the inlay 19 having an integrated circuit 20 (not represented) spaced apart from the contact structure 15 and at least one antenna 21 (not represented). The inlay 19 furthermore has an upper layer 17 which is arranged above the inlay 19, the upper layer 17 having the recess 14 in which the contact structure 15 is arranged. In other words, an upper face of the upper layer 17 forms the upper face 11a of the card body 11, or of the data carrier in the form of a card 10.

The inlay 19 furthermore has a lower layer 18 (not represented) which is arranged underneath the inlay 19. In other words, a lower face of the lower layer 18 forms the lower face 11b of the card body 11, or of the data carrier in the form of a card 10.

By way of example, the upper layer 17 may comprise a continuous metal layer 34 (not represented) and a ferrite layer 35 (not represented), the ferrite layer 35 being arranged between the metal layer 34 and the flexible inlay 19. Alternatively, the lower layer 18 may comprise a continuous metal layer 34 and a ferrite layer 35, the ferrite layer 35 being arranged between the metal layer 34 and the flexible inlay 19.

Advantageously, by means of the inlay, the integrated circuit and/or the antenna may be relocated from the region of the recess 14 and a metal layer may nevertheless be present in the data carrier in the form of a card. This has the advantage, in particular, that the relocation from the recess 14 makes it possible to use an enlarged antenna, so that both the transmission power and the energy input are increased.

FIG. 2 shows a sectional representation of a data carrier in the form of a card 10 according to a further exemplary embodiment. The data carrier in the form of a card 10 may be configured by way of example in a similar way to FIG. 1. The data carrier in the form of a card 10 is formed by way example as a layer stack with an upper face 11a and a lower face 11b, between which the individual layers are arranged, preferably parallel to one another. In particular, the layer stack forms the card body 11 of the data carrier in the form of a card 10.

In the layer stack of the data carrier in the form of a card 10 as represented in FIG. 2, an upper layer 17, a flexible inlay 19 and a lower layer 18 are provided. The upper layer 17 is arranged above the inlay 19 and the lower layer 18 is arranged underneath the inlay 19. The inlay 19 has by way of example an upper side 19a and a lower side 19b. In other words, the upper layer 17 is arranged on the upper side 19a of the inlay 19 and the lower layer 18 is arranged on the lower side 19b of the inlay 19. The flexible inlay 19 may by way of example be formed from a flexible plastic such as PET (polyethylene terephthalate).

The flexible inlay 19 has a contact structure 15 arranged on the upper side 19a with by way of example three contacts 15a represented. The contacts 15a of the contact structure 15 may by way of example be formed from aluminum. The inlay 19 furthermore has an integrated circuit 20 spaced apart from the contact structure 15 and an antenna 21. By way of example, the integrated circuit 20 and the antenna 21 are arranged on the lower side 19b of the inlay 19. The integrated circuit 20 is configured by way of example as a chip. For example, a flip-chip method may be employed. The antenna 21, in particular a coil, is coupled with the integrated circuit 20 and runs by way of example in the region of a circumferential face 13 of the data carrier in the form of a card 10. The antenna 21 supplies the integrated circuit 20 with energy and/or signals.

For contacting the data carrier in the form of a card 10 via the contacts 15a, the integrated circuit 20 is connected to the contacts 15a by means of inner lines (not represented here) of the inlay 19. The data carrier in the form of a card 10 may thus provide a dual-interface functionality.

The integrated circuit 20 and/or the antenna 21 may also be arranged on the upper side 19a of the flexible inlay 19. Since the individual turns of the antenna 21 are arranged in the region of the circumferential face 13 of the data carrier in the form of a card 10, the size or diameter of the antenna 21 may be maximized. This improves both the energy input into the integrated circuit 20 and the data transmission to the integrated circuit 20.

A recess 14, which is adapted to receive the contact structure 15 of the data carrier in the form of a card 10, is arranged in the upper layer 17. In other words, the upper layer 17 has the recess 14 in which the contact structure 15 is arranged. The recess 14 penetrates through the entire thickness of the upper layer 17 and has dimensions that correspond to the dimensions of the contact structure 15, particularly in terms of width and length. On a lower border of the recess 14, particularly in the region of the contact structure 15, a chamfer 14a that facilitates insertion of the contact structure 15 into the recess 14 is respectively provided on both sides.

FIG. 2 represents the layer stack of the data carrier in the form of a card 10 during the production of the data carrier in the form of a card 10. The individual layers of the layer stack are already mutually aligned or positioned, but the data carrier in the form of a card 10 is not yet laminated.

The upper layer 17 has a continuous metal layer 34 and a ferrite layer 35, the ferrite layer 35 being arranged between the metal layer 34 and the flexible inlay 19. Furthermore, a first adhesive layer 31 is arranged between the ferrite layer 35 and the metal layer 34 and a second adhesive layer 32 is arranged between the ferrite layer 35 and the inlay 19, the recess 14 extending through the metal layer 34, the adhesive layers 31, 32 and the ferrite layer 35. In other words, the sequence of the layers present in the upper layer 17 is configured by way of example as follows: The second adhesive layer 32 is arranged on the upper side 19a of the inlay 19. The ferrite layer 35 is arranged on the second adhesive layer 32. The first adhesive layer 31 is arranged on the ferrite layer 35 and the metal layer 34, which forms an outer-lying layer or the upper face 11a of the data carrier in the form of a card 10, is arranged on the first adhesive layer 31. The recess 14 in which the contact structure 15 is arranged is configured in particular as a hole in the upper layer 17, which extends through the metal layer 34, the adhesive layers 31, 32 and the ferrite layer 35.

The lower layer 18 has by way of example a plastic layer 30, a layer 36 with optical features and an outer-lying overlay layer 37. In other words, the sequence of the layers present in the lower layer 18 is configured by way of example as follows: The plastic layer 13 is arranged on the lower side 19b of the inlay 19. The layer 36 with optical features, which may by way of example also be formed from plastic, is arranged underneath the plastic layer 30. The overlay layer 37, which forms an outer-lying layer or lower face 11b of the data carrier in the form of a card 10, is arranged underneath the layer 36 with optical features. In particular, the overlay layer 37 may in general be configured to be transparent and formed from plastic. The plastic layer 30 may for example be used as electrical insulation for subsequent metal layers, or may protect the flexible inlay 19 during the assembly of data carrier in the form of a card 10.

Furthermore, an insert 22 which positions the contact structure 15 in the recess 14 of the upper layer 17 is arranged underneath the contact structure 15. The insert 22 is preferably arranged between the plastic layer 30 and the layer 36 with optical features. By way of example, the dimensions of the insert 22 correspond to the dimensions of the recess 14. During assembly of the data carrier in the form of a card 10, this insert 22 is forced or pressed upward, that is to say in the direction of the recess 14, so that the contact structure 15 is pushed upward into the recess 14. The plastic layer 30 may in this case protect the inlay 19, or the antenna 21.

In particular, a height of the insert 22, of the inlay 19, of the plastic layer 30 and of the contact structure 15 may correspond to a height of the recess 14 of the upper layer 17. This ensures that the upper face of the contact structure 15 is flush with the upper face 11a of the data carrier in the form of a card 10.

Figure 3:
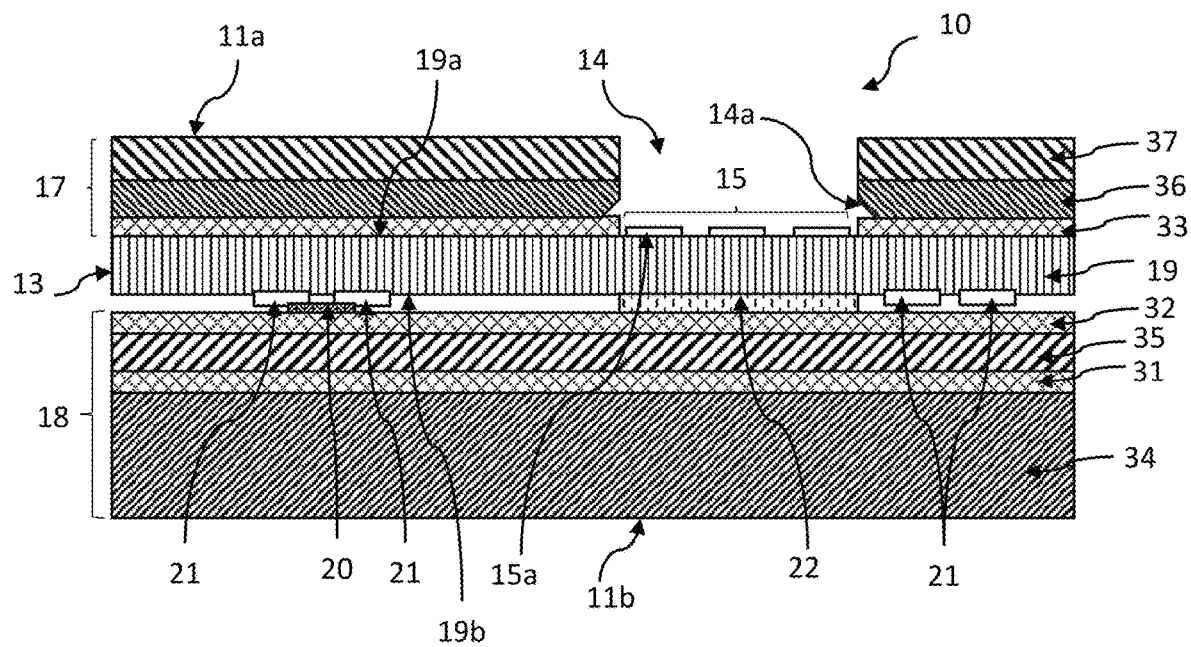
FIG. 3: shows a sectional representation of a data carrier in the form of a card according to a third exemplary embodiment.

FIG. 3 shows a sectional representation of the data carrier in the form of a card 10 according to a third exemplary embodiment. The structure, or the layer sequence, of the data carrier in the form of a card 10 of FIG. 3 is similar to the structure of the data carrier in the form of a card 10 represented in FIG. 2. Accordingly, reference will partially be made to FIG. 2.

In particular, the data carrier in the form of a card 10 has the upper layer 17, the flexible inlay 19 and the lower layer 18. In a similar way to FIG. 2, the flexible inlay has the contact structure 15, the integrated circuit 20 and the antenna 21. The recess 14 for the contact structure 15 is provided in the upper layer 17, in a similar way to FIG. 2. A chamfer is likewise provided as in FIG. 2.

In contrast to FIG. 2, in FIG. 3 the lower layer 18 and the upper layer 17 are configured as follows: The lower layer 18 has a continuous metal layer 34 and a ferrite layer 35, the ferrite layer 35 being arranged between the metal layer 34 and the flexible inlay 19. Furthermore, a first adhesive layer 31 is arranged between the ferrite layer 35 and the metal layer 34 and a second adhesive layer 32 is arranged between the ferrite layer 35 and the inlay 19. In other words, the sequence of the layers present in the lower layer 18 is configured by way of example as follows: The second adhesive layer 32 is arranged on the lower side 19b of the inlay 19. The ferrite layer 35 is arranged underneath the second adhesive layer 32. The first adhesive layer 31 is arranged underneath the ferrite layer 35 and the metal layer 34, which may form an outer-lying layer or lower face 11b of the data carrier in the form of a card 10, is arranged underneath the first adhesive layer 31. Advantageously, the metal layer 34 may be configured to be thicker so that the data carrier in the form of a card 10 comprises more metal material in order to increase the efficacy.

Further, the upper layer 17 has a third adhesive layer 33, a layer 36 with optical features and an outer-lying overlay layer 37, the third adhesive layer 33 being arranged between the layer 36 with optical features and the inlay 19, the recess 14 extending through the third adhesive layer 33, the layer 36 with optical features and the overlay layer 37. In other words, the sequence of the layers present in the upper layer 18 is configured by way of example as follows: The third adhesive layer 33 is arranged on the upper side 19a of the inlay 19. The layer 36 with optical features is arranged on the third adhesive layer 33. The overlay layer 37, which forms an outer-lying layer or upper face 11a of the data carrier in the form of a card 10, is arranged on the layer 36 with optical features. The recess 14 in which the contact structure 15 is arranged is configured in particular as a hole in the upper layer 17, which extends through the third adhesive layer 33, the layer 36 with optical features and the overlay layer 37.

Further, an insert 22 which positions the contact structure 15 in the recess 14 of the upper layer 17 is arranged underneath the contact structure 15. In contrast to FIG. 2, the insert 22 in FIG. 3 is arranged between the inlay 19 and the second adhesive layer 32. A height of the insert 22, of the inlay 19 and of the contact structure 15 may correspond to a height of the recess 14 of the upper layer 17. This ensures that the upper face of the contact structure 15 is flush with the upper face 11a of the data carrier in the form of a card 10.

The data carrier in the form of a card 10 may, for example, have a thickness or height of about 920 μm. The thickness of the entire card body 11 should not exceed the maximum thickness of a card body 11 according to ISO 7810.

Figure 4:
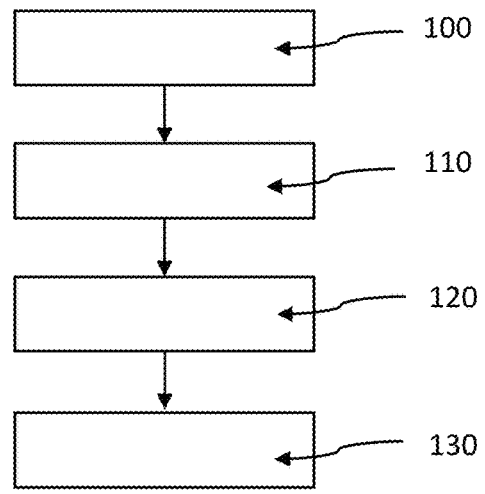
FIG. 4: shows a schematic representation of a method for producing a data carrier in the form of a card.

FIG. 4 shows a schematic representation of a method for producing a data carrier in the form of a card 10. The method essentially describes the production of the data carriers in the form of cards 10 as represented in FIGS. 1 to 3.

In a first step 100, a flexible inlay 19 with a contact structure 15 of the data carrier in the form of a card 10, which is arranged on an upper side of the inlay 19, is provided, the inlay 19 having an integrated circuit 20 spaced apart from the contact structure 15 and at least one antenna 21.

In a second step 110, an upper layer 17 having a recess 14 is arranged on the upper side of the inlay 19, in such a way that the contact structure 15 is arranged in or on the recess 14. This arrangement may comprise alignment or positioning and optionally an adhesive bonding process. The contact structure 15 may already be partially arranged in the recess 14 or on, that is to say underneath, the recess 14.

In a third step 120, a lower layer 18 is arranged underneath the inlay 19. Optionally, an insert 22 may be arranged in or on the lower layer 18. The dimensions of the insert 22 correspond to the dimensions of the recess 14.

In a fourth step 130, the individual layers are laminated to form a data carrier in the form of a card 10. The individual layers of the data carrier in the form of a card 10 are brought together under the action of heat and pressure.

During the lamination or during assembly of the data carrier in the form of a card 10, the insert 22, if it is present, is pressed into the recess 14 so that the contact structure 15 is pushed upward toward the upper face 11a.

The various steps of the method may also be carried out in other sequences. It is likewise possible to join a plurality of layers together in a single adhesive bonding process.

The invention claimed is:

1. A data carrier in a form of a card having a flexible inlay with a contact structure arranged on an upper side of the inlay, the inlay having an integrated circuit spaced apart from the contact structure and at least one antenna, an upper layer which is arranged above the inlay, the upper layer having a recess in which the contact structure is arranged, and a lower layer which is arranged underneath the inlay,
   wherein the upper layer comprises a continuous metal layer and a ferrite layer, the ferrite layer being arranged between the metal layer and the flexible inlay, and
   wherein the integrated circuit is spaced apart from the recess.

2. The data carrier in the form of a card according to claim 1, wherein a first adhesive layer is arranged between the ferrite layer and the metal layer and a second adhesive layer is arranged between the ferrite layer and the inlay, the recess extending through the metal layer, the adhesive layers and the ferrite layer.

3. The data carrier in the form of a card according to claim 1, wherein the lower layer comprises a plastic layer a layer with optical features and an outer-lying overlay layer.

4. The data carrier in the form of a card according to claim 3, wherein an insert which positions the contact structure in the recess of the upper layer is arranged underneath the contact structure.

5. The data carrier in the form of a card according to claim 4, wherein the insert is arranged in the lower layer underneath the contact structure, the insert being arranged between the plastic layer and the layer with optical features.

6. The data carrier in the form of a card according to claim 4, wherein a height of the insert, of the inlay, of the plastic layer and of the contact structure corresponds to a height of the recess of the upper layer.

7. The data carrier in the form of a card according to claim 1, wherein the metal layer is covered with at least one outer-lying layer.

8. The data carrier in the form of a card according to claim 1, wherein inner-lying edges of the recess of the upper layer are provided with a chamfer.

9. The data carrier in the form of a card according to claim 1, wherein the antenna is arranged in a region of a circumferential face of the data carrier in the form of a card.

10. A method for producing a data carrier in the form of a card according to claim 1, having the steps:
    providing a flexible inlay having a contact structure of the data carrier in the form of a card, which is arranged on an upper side of the inlay, the inlay having an integrated circuit spaced apart from the contact structure and at least one antenna,
    arranging an upper layer having a recess on the upper side of the inlay, in such a way that the contact structure is arranged in the recess,
    arranging a lower layer underneath the inlay, and
    laminating the layers to form a data carrier in the form of a card.

11. A data carrier in a form of a card having a flexible inlay with a contact structure arranged on an upper side of the inlay, the inlay having an integrated circuit spaced apart from the contact structure and at least one antenna, an upper layer which is arranged above the inlay, the upper layer having a recess in which the contact structure is arranged, and a lower layer which is arranged underneath the inlay,
    wherein the lower layer comprises a continuous metal layer and a ferrite layer, the ferrite layer being arranged between the metal layer and the flexible inlay, and
    wherein the integrated circuit is spaced apart from the recess.

12. The data carrier in the form of a card according to claim 11, wherein the upper layer comprises a third adhesive layer, a layer with optical features and an outer-lying overlay layer, the third adhesive layer being arranged between the layer with optical features and the inlay, the recess extending through the third adhesive layer, the layer with optical features and the overlay layer.

13. The data carrier in the form of a card according to claim 11, wherein a first adhesive layer is arranged between the ferrite layer and the metal layer and a second adhesive layer is arranged between the ferrite layer and the inlay.

14. The data carrier in the form of a card according to claim 13, wherein an insert which positions the contact structure in the recess of the upper layer is arranged underneath the contact structure.

15. The data carrier in the form of a card according to claim 14, wherein the insert is arranged on the lower layer underneath the contact structure, the insert being arranged between the inlay and the second adhesive layer.

16. The data carrier in the form of a card according to claim 14, wherein a height of the insert, of the inlay and of the contact structure corresponds to a height of the recess of the upper layer.

* * * * *